United States Patent [19]

Whitmore

[11] 4,191,652
[45] Mar. 4, 1980

[54] APPARATUS FOR FILTER BACKWASHING

[75] Inventor: Edward A. Whitmore, Salt Lake City, Utah

[73] Assignee: Envirotech Corporation, Menlo Park, Calif.

[21] Appl. No.: 863,380

[22] Filed: Dec. 22, 1977

[51] Int. Cl.² .................................................. B01D 23/24
[52] U.S. Cl. ...................................... 210/274; 210/275; 210/279; 210/411
[58] Field of Search ............... 210/274, 275, 279, 283, 210/198, 266, 289, 291, 411, 425, 427

[56] References Cited

U.S. PATENT DOCUMENTS

| 2,956,682 | 10/1960 | Stephan | 210/279 X |
| 3,276,585 | 10/1966 | Kalinske | 210/279 X |
| 3,831,761 | 8/1974 | Chantereau | 210/279 X |
| 4,032,443 | 6/1977 | Ross | 210/279 X |
| 4,076,625 | 2/1978 | Scholten et al. | 210/279 X |

Primary Examiner—Charles N. Hart
Assistant Examiner—Ferris H. Lander
Attorney, Agent, or Firm—Hal J. Bohner; John J. Morrissey

[57] ABSTRACT

An apparatus for filter backwashing includes a vessel containing a bed of filter media. Laterals with nozzles are disposed below the filter media to convey backwashing air and water into the filter bed. Below the laterals are located a manifold and a distribution plenum to carry air into the laterals. The manifold and the distribution plenum are separated by a common wall having a plurality of ports to provide communication therebetween. Communication between the distribution plenum and the laterals is provided by a plurality of conduits, one conduit extending into each lateral from the distribution plenum.

25 Claims, 4 Drawing Figures

APPARATUS FOR FILTER BACKWASHING

BACKGROUND OF THE INVENTION

1. Field of the Invention

The present apparatus relates to filtering liquids which contain particulate matter.

2. State of the Art

Water often contains particulate material which must be removed before the water can be used. For example, many industrial processes require water which has only minimal quantities of particulate matter. One conventional method for removing particulate material from water is to pass the water downwardly through a bed of filter media comprising sand or some other granular material while removing the filtered water from beneath the filter bed. As the process is carried out particulate material accumulates in the bed thus resulting in a loss of hydraulic head across the bed. After a substantial quantity of particles builds up in the bed the head loss becomes so great that it is necessary to stop the filtering process and remove the deposited particles. Generally the particles are removed by passing streams of air and water upwardly through the bed thereby suspending the media, causing separation of the media particles, and carrying deposited particles upwardly and thence to disposal. This process is called backwashing.

Backwashing a filter bed often is carried out in two steps; first the bed is air backwashed and then it is water backwashed. The air backwashing step loosens and separates the particles of the filter bed, and the water backwashing step fluidizes the bed and carries deposited particles upward and from the bed. In both steps fluid flow through the bed must be uniform across the breadth of the bed. If the flow is not uniform, in areas of high velocity the flow will cause particles of the filter media to be carried upward and lost to disposal along with the deposited particles. Whereas, in areas of low velocity, little or no backwashing will occur. Also, filter beds are often composed of layers of different particulate materials, and non-uniform backwashing velocity can result in mixing of the layers.

One conventional device for backwashing a filter bed is taught in U.S. Pat. No. 3,954,620. This patented device comprises a perforated floor which supports the filter bed and a plurality of horizontally disposed conduits arranged below the floor. A plurality of nozzles are affixed beneath the floor and in communication with the conduits. Connected to the conduits is a means for introducing backwashing air and water into the conduits so that the air and water will flow through the nozzles and upwardly through the perforations in the floor and thence into the filter bed. In this conventional device the conduits, the nozzles, and the floor are arranged relative to one another so that two plenum chambers are formed, one between the conduits and the nozzles and one between the nozzles and the floor. In this system the nozzles, which are beneath the perforated floor, do not contact the filter bed. During air backwashing one cushion of air is formed in each of the two plenum chambers. The cushions of air aid in equalizing the air pressure across the filter bed; however, such a two-cushion system, with only one cushion of air preceding the nozzles, has proved to be difficult and expensive to construct and is believed inadequate to give uniform air distribution.

OBJECTS OF THE INVENTION

An object of the present apparatus is to provide a filter with an air backwashing device having three cushions of air. A further object is to provide a filter with air backwashing nozzles in direct contact with the filter bed and three cushions of air upstream of the nozzles.

BRIEF DESCRIPTION OF THE DRAWINGS

Further objects and advantages of the present invention can be readily ascertained by reference to the following description and drawings, which are offered by way of example only and not in limitation of the invention, the scope of which is defined in the appended claims and by equivalents to the structure, materials and acts set forth hereinafter.

In the drawings.

DETAILED DESCRIPTION OF THE INVENTION

Figure 1:
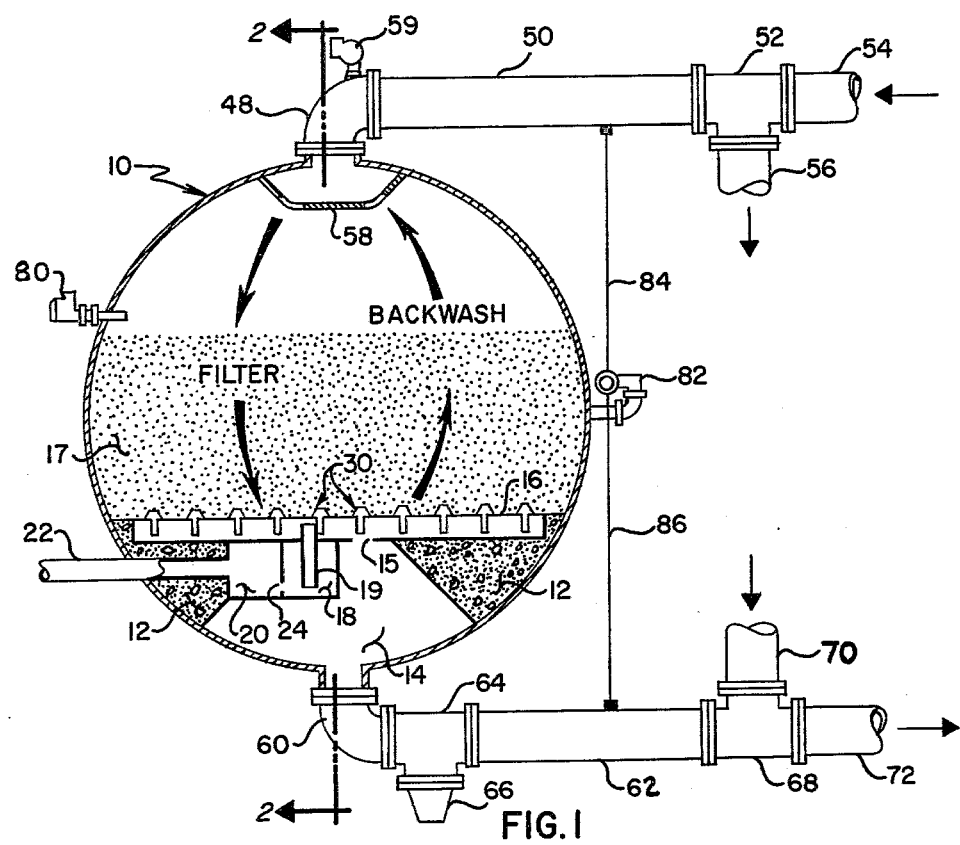
FIG. 1 is a view in cross section of an apparatus according to the present invention.
Figure 2:
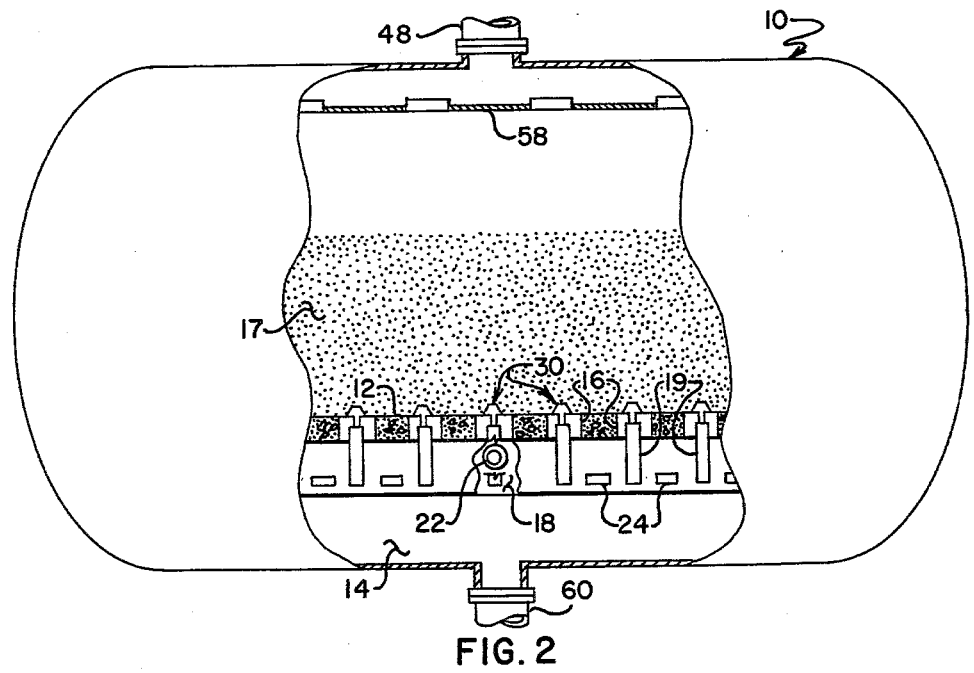
FIG. 2 is a longitudinal view of the apparatus of FIG. 1 in partial cut-away.

The filter shown in FIGS. 1 and 2 includes a closed cylindrical vessel 10 which is horizontally disposed. Inside the vessel 10 is a floor 12 formed of concrete which occupies the lower part of the vessel 10 and extends throughout its length. As will be discussed hereinafter, the floor 12 contains elements of the filter and provides support for other elements. A header 14 is formed in the floor 12 and is a substantially trapezoidal chamber extending parallel to the horizontal axis of the vessel 10 throughout its length. A plurality of laterals 16 is provided comprising rectangular conduits fixedly mounted in the floor 12 perpendicular to the axis of the vessel 10 with their upper surfaces in the plane of the top of the floor 12.

The laterals 16 are mounted atop the header 14, and rectangular ports 15 are formed along the upper face of the header 14 one beneath each lateral 16 to provide fluid flow between the interior of the header 14 and the laterals 16. A bed of filter media 17 is disposed on the laterals 16 and the floor 12 and fills a substantial part of the vessel 10. The filter media 17 is conventional and can comprise, for example, sand or activated carbon.

Figure 3:
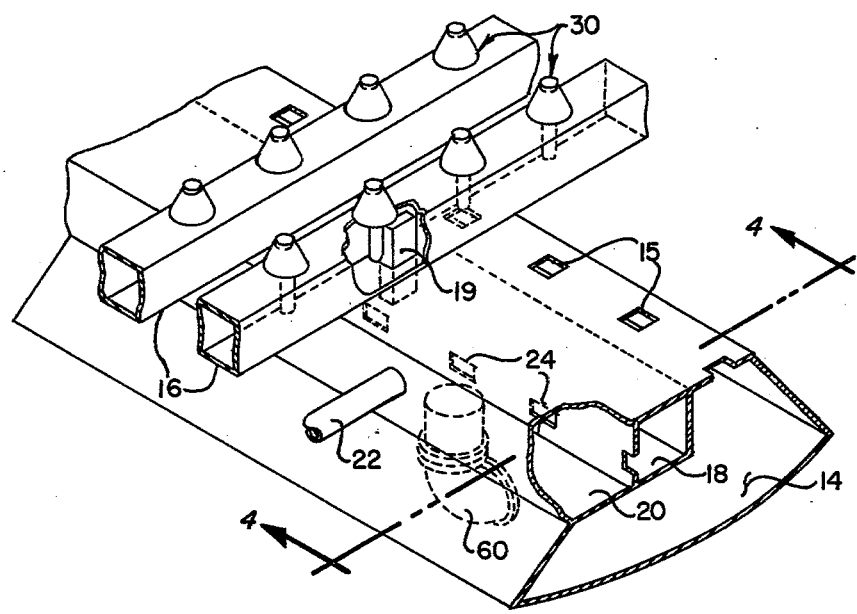
FIG. 3 is a pictorial view, partially cut-away of a portion of the apparatus of FIG. 1.
Figure 4:
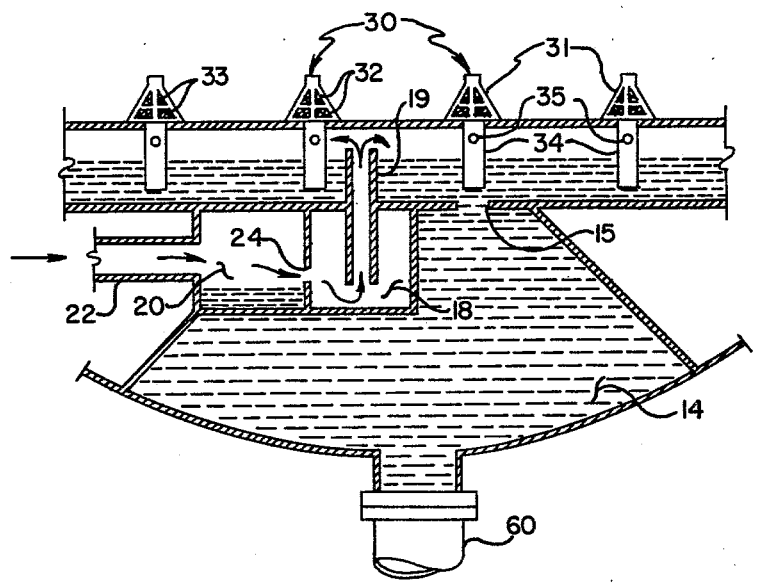
FIG. 4 is another cut-away view of part of the apparatus of FIG. 1.

Within the header 14 is formed a distribution plenum 18 comprising a rectangular conduit extending the length of the vessel 10 and parallel thereto. The distribution plenum 18 has a cross-sectional area substantially less than that of the header 14, and the plenum is mounted so its upper face is coincident with the upper face of the header 14. A plurality of rectangular conduits 19 is provided, one conduit being mounted in each lateral 16 to pass into the distribution plenum 18 to provide fluid communication with the distribution plenum 18. As best shown in FIGS. 3 and 4 the conduits 19 are disposed so that their upper ends are, say one inch below the upper face of the lateral 16 and their lower ends are, say two inches above the lower face of the distribution plenum 18.

Further with reference to FIGS. 3 and 4, a manifold 20 comprises a rectangular conduit disposed along the outside of the left face of the header 14 and extending the length of the vessel 10 and parallel thereto. Rectangular orifices 24 are formed along the lower part of the right face of the manifold 20 to provide fluid communication between the manifold 20 and the distribution plenum 18. In practice, the orifices 24 are about one inch by about six inches. In certain applications the orifices 24 are spaced apart on about twelve inch centers, while in others applications the centers can be as far apart as about two feet. In practice this spacing is set so that the velocity of flow through the orifices is about 30 feet per second. An air inlet pipe 22 passes through the floor 12 and is connected to the manifold 20 to convey air thereinto. The air inlet pipe 22 is located midway between the ends of the vessel 10, and is positioned so that air issuing therefrom is directed against the side of the manifold 20, not directly through an orifice 24. In practice the two orifices 24 nearest the air inlet pipe 22 are spaced apart about four feet and the air inlet pipe 22 is directed generally midway between them.

The bottoms of the conduits 19 are generally disposed lower than the bottoms of the orifices 24, although in some applications the bottoms of the conduits 19 can be higher than the top of the orifices 24.

In practice the laterals 16, distribution plenum 18 and manifold 20 must be accurately leveled so that they are substantially horizontal. This must be done to insure that the ports and orifices in each element are substantially equal in elevation to other corresponding ports and orifices respectively to equalize the flow of air, as will be discussed hereinafter.

Referring now to FIGS. 3 and 4, each lateral 16 has a plurality of nozzles 30 fixedly mounted in a row along its top. The nozzles 30 are conventional and each nozzle includes a hollow, conical collector 31 formed of a rigid material such as plastic and having a plurality of ports 32 formed in its sides. Wire screens 33 are disposed inside the conical collectors 31 so that liquid passing through the ports 32 also passes through the screens 33. Each wire screen 33 is connected to the collector 31 so that the screen flexes inwardly when filtering occurs and pops outward when backwashing takes place. When the screen 33 pops outward particles are dislodged from the screen thereby preventing any plugging which might occur. The collector 31 and screen 33 are taught, for example, in U.S. Pat. No. 3,245,540. The patented collector and screen are included in Flexkleen ® nozzles manufactured by Envirotech Corporation. The nozzles 30 further include hollow pipes 34 mounted to the bottom of the collectors 31 and in communication with the interiors of the collectors 31. The pipes 34 extend downward into the laterals 16, and ports 35 are formed near the upper end of each pipe 34 inside the laterals 16 to permit fluid flow. Preferably the ports 35 are located a substantial distance above the bottom of the laterals 16, say 80% of the height of the lateral.

Referring now to FIGS. 1 and 2 an upper connector 48 connected to the top of the vessel 10 midway between the ends of the vessel couples an inlet pipe 50 in liquid flow communication with the vessel 10. A two-way valve 52 is connected in liquid-flow communication with the inlet pipe 50 to permit liquid flow between the inlet pipe 50 and either an influent line 54 or a backwash waste line 56, depending upon the position of the valve 52. A lower connector 60 is connected to the bottom of the vessel 10 midway between its ends, and in fluid-flow communication with the header 14. A three-way valve 64 is connected to the lower connector 60 to permit liquid flow between the lower connector 60 and either a drain pipe 66 or an effluent pipe 62. In the third position, the valve 64 blocks flow from the header 14. The effluent pipe 62 is connected in liquid-flow communication with the three-way valve 64 and a second two-way valve 68. The second two-way valve 68 can be positioned to permit liquid flow between the effluent pipe 62 and either a backwash influent line 70 or a filtrate effluent line 72. The backwash influent line is connected to a controllable source of pressurized clear water, not shown; the filtrate effluent line 72 is connected to a container or other means to receive filtered water, not shown; and the drain pipe 66 is connected to a means, not shown, to carry waste water to disposal.

A conventional level control probe 80 is affixed to the side of the vessel 10 above the level of the media 17 to transmit electrical signals to a control means to control the operation of the filter as will be discussed hereinafter. A differential pressure unit 82 is coupled via lines 84 and 86 to the inlet pipe 50 and effluent pipe 62 respectively to transmit electrical signals to control the operation of the filter. A conventional air relief valve 59 is connected to the inlet pipe 50 to permit air to escape from the vessel.

It should be understood that the system described above comprises a particular arrangement and geometry of the vessel 10, laterals 16 and nozzles 30. However, the vessel, laterals and nozzles can be constructed and arranged according to other configurations conventional in the art.

The operation of the present filter apparatus can be understood as follows. When the filter is in its filtering mode, the valve 52 is positioned to permit liquid flow into the vessel 10 via influent line 54. The liquid flows into the vessel 10 and passes downward through the filter media 17 either under the influence of gravity alone or due to pressure applied to the influent liquid as indicated by the downwardly directed arrows. As the liquid flows through the filter media, solids from the liquid collect in the media 17, and the filtered liquid passes from the media into the nozzles 30.

The filtered liquid passes through the nozzles 30, into the laterals 16, through the ports 15 and into the header 14. From the header 14 the filtered liquid flows through valve 64, effluent pipe 62, valve 68 and thence through filtrate effluent line 72 to storage or directly to use.

As liquid is filtered, solids build up in the media 17 causing a head loss across the media. This head loss is measured by differential pressure unit 82, and when the head loss reaches a predetermined value, the pressure unit 82 transmits a signal to a conventional control system which stops the filtering operation and initiates the backwashing operation.

The backwashing operation comprises passing pressurized air upwardly through the media 17 to loosen and separate the particles forming the media 17 and thereafter passing water upwardly through the media to carry filtered particles from the media 17 to disposal as indicated by the upwardly directed arrows. To accomplish the air washing step, first the liquid contained in the vessel 10 is allowed to flow from the vessel until its surface is a predetermined distance, say about six inches, above the surface of the media 17, and then valve 64 is closed so that the liquid level drops no further. It should be understood that at this time filtered liquid fills lateral 16 and the other parts of the system below them. Pressurized air is introduced into the air inlet pipe 22 to pass into the manifold 20, the distribution plenum 18, the conduits 19, the laterals 16 and the nozzles 30 to thence rise through the media 17. This flow of air displaces the liquid in these elements of the system to form pools of water with cushions of air overlying the pools as shown in FIG. 4. In practice the distribution plenum 18 is generally substantially evacuated of water, although in certain applications the bottoms of the conduits 19 are located substantially above the floor of the plenum 18 so that a pool of water is formed in the bottom of the plenum 18.

It should be appreciated that three cushions of air in series are thus formed. In particular, manifold 20, distribution plenum 18 and laterals 16 each contains a cushion of air. As mentioned above, the purpose of the air cushions is to insure that air at substantially equal pressure is received by each nozzle during air backwashing. Only by providing substantially equal air pressure at each nozzle can backwashing with a uniform velocity across the filter bed be realized. Non-uniform air backwashing can lead to non-uniform water backwashing which results in inadequate cleaning of the filter bed and loss of particles of the filter bed to disposal. In practice it has been found that an air backwashing device having only two cushions of air produces non-uniform backwashing; whereas the present three-cushion apparatus produces substantially uniform backwashing.

In practice, as mentioned above, it is important that the orifices 24 all be at substantially the same elevation. Also, the conduits 19 are all disposed at the same elevation with respect to each other, and the nozzle ports 35 are at substantially the same elevation with respect to each other, so that the three cushions of air are each of substantially constant depth throughout the system. In this way it is assured that the pressure of the air leaving each of the nozzles 30 is substantially the same so that the rate of backwashing is substantially the same throughout the filter media 17. It can be appreciated that as pressurized air flows out of the nozzles 30, the screens 32 pop outwardly thereby dislodging particles which could clog the nozzles.

After the air backwashing step is completed, water backwashing is begun. In the water backwashing step valve 68 is oriented so that backwashing water is introduced under pressure through influent line 70. The backwashing water thereafter flows upward through the header 14, the nozzles 30 and thence through the filter media 17 to fluidize the media and carry filtered particles through pipe 50. The valve 52 is oriented so that the contaminated backwashing water passes from pipe 50 and through waste line 56 and thence to disposal. According to conventional practice, the air and water backwashing steps can be controlled by a control system which receives signals from the differential pressure unit 82 and the level control probe 80.

I claim:

1. Apparatus for filtering liquid wherein the liquid to be filtered flows downward through the apparatus, said apparatus comprising:
   (a) a vessel for containing a bed of particulate filter media, said vessel having an inlet for admitting liquid to be filtered and an outlet for removing filtered liquid;
   (b) water backwashing means for admitting backwashing water below the bed of filter media in said vessel to flow upward through the bed of filter media, said water backwashing means comprising a header disposed in said vessel, a plurality of laterals disposed in said vessel below the bed of filter media and above said header, each of said laterals being in liquid flow communication with said header so that a substantially uniform water level can be maintained in all of said laterals, a plurality of nozzles mounted on each of said laterals, each of said nozzles comprising a collector and a hollow pipe, said collector being a port-defining structure, a proximal end of said pipe being attached to said collector, said pipe having an apertured portion adjacent said proximal end, said collector and pipe of each of said nozzles being configured to permit passage of backwashing water upward from the lateral on which the nozzle is mounted via said pipe through a port defined by said collector into the bed of filter media, a distal end of the pipe of each of said nozzles extending downward into the lateral on which the nozzle is mounted;
   (c) air backwashing means cooperatively connected to said water backwashing means for admitting backwashing air into said vessel below the bed of filter media, said air backwashing means comprising a manifold, an air supply means to convey a stream of pressurized air to said manifold, and a distribution plenum, said manifold and said distribution plenum being in fluid communication with each other, said manifold and said distribution plenum being disposed below said laterals, a plurality of conduits, each lateral being interconnected with said distribution plenum by one of said conduits, each conduit extending into one of said laterals to an elevation above the distal ends of the pipes that extend downward into the laterals, said conduits permitting passage of backwashing air from said distribution plenum into said laterals and thence through the apertured portions of said pipes into said nozzles for passage into the bed of filter media, whereby the stream of pressurized air provides cushions of air in said manifold, said distribution plenum and said laterals, so that a substantially uniform pressure of backwashing air passing into the bed of filter media from said nozzles can be maintained for all of said nozzles.

2. The apparatus of claim 1 wherein said nozzles are located beneath the bed of filter media and in contact with the media.

3. The apparatus of claim 1 wherein said manifold and said distribution plenum are interconnected by a plurality of spaced-apart orifices.

4. The apparatus of claim 1 wherein the apertured portions adjacent the proximal ends of the pipes that extend downward into each lateral are at substantially the same elevation.

5. An apparatus for filtering a liquid, said apparatus comprising:
   (a) a vessel for receiving said liquid to be filtered, said vessel having inlet means and outlet means, said vessel also having a bottom through which filtered liquid can be removed by valve means;
   (b) a floor disposed within said vessel above and spaced apart from said bottom, said floor serving to support a bed of filter media;
   (c) a plurality of laterals horizontally disposed in said floor beneath said filter media;
   (d) a plurality of nozzles connected to each lateral, each nozzle comprising a port-defining collector and a hollow pipe, a proximal end of said pipe being attached to said collector, said pipe having an apertured portion adjacent said proximal end, said nozzle serving to permit passage of backwashing water upward from said lateral into said bed of filter media, a distal end of said pipe extending downward into said lateral;

(e) header means connected to said laterals to provide liquid-flow communication between said outlet means of said vessel and said laterals, said header means being disposed below said laterals and providing liquid communication among said laterals so that a substantially uniform water level can be maintained in all of said laterals;

(f) a distribution plenum disposed below said laterals;

(g) conduit means comprising a plurality of conduits, said conduits being connected one to each lateral and to said distribution plenum, said conduit means providing fluid communication between said laterals and said distribution plenum, each conduit extending into a corresponding lateral to an elevation above the distal ends of the pipes extending downward into said corresponding lateral;

(h) a manifold disposed below said laterals, said manifold being in fluid communication with said distribution plenum; and (i) air introduction means connected to said manifold for introducing pressurized backwashing air into said manifold, so that cushions of air can be formed in said manifold, in said distribution plenum and in said laterals as said backwashing air passes from said manifold into said distribution plenum and thence via said conduit means into said laterals and thence through said apertured portions of said pipes into said nozzles for passage into the bed of filter media, said cushions of air serving to provide substantially uniform air pressure for said backwashing air from said nozzles.

6. The apparatus of claim 5 wherein said distribution plenum is disposed within said vessel.

7. The apparatus of claim 6 wherein said manifold is disposed within said vessel.

8. The apparatus of claim 7 wherein a wall portion of said manifold is coincident with a wall portion of said distribution plenum, said coincident wall portion being apertured to provide fluid communication between said manifold and said distribution plenum.

9. The apparatus of claim 8 wherein said coincident wall portion has a plurality of orifices, said orifices being located at approximately the same elevation as the lower ends of the conduits that extend downward into said distribution plenum.

10. The apparatus of claim 5 wherein the apertured portions adjacent the proximal ends of the pipes that extend downward into said laterals are all at substantially the same elevation.

11. A filtration apparatus in which a liquid to be filtered passes through a filter bed, and in which said filter bed can be backwashed by pressurized air and water, said apparatus comprising:

(a) a vessel having a floor structure to support said filter bed;

(b) a header disposed below said floor structure;

(c) a plurality of laterals disposed below said filter bed and above said header, each of said laterals being in liquid-flow communication with said header so that water rising from said header into said laterals can attain substantially the same level in each of said laterals;

(d) a plurality of nozzles connected to each of said laterals, said nozzles providing fluid communication between said laterals and said filter bed;

(e) an air distribution plenum disposed below said laterals;

(f) an air manifold in fluid communication with said distribution plenum;

(g) a plurality of conduits, each one of said conduits providing fluid-flow communication between a corresponding one of said laterals and said air distribution plenum;

(h) means for introducing pressurized air into said air manifold so that cushions of air can be formed in said manifold, in said distribution plenum and in said laterals, thereby providing a substantially uniform air pressure for backwashing air passing into said filter bed via said nozzles.

12. The filtration apparatus of claim 11 wherein said vessel is of cylindrical configuration, the cylindrical axis of said vessel extending substantially horizontally.

13. The filtration apparatus of claim 12 wherein said header extends within said vessel substantially parallel to the cylindrical axis of said vessel.

14. The filtration apparatus of claim 11 wherein said laterals are mounted atop said header within said vessel.

15. The filtration apparatus of claim 14 wherein liquid-flow communication between each lateral and said header is provided by a port in a common wall separating said lateral from said header.

16. The filtration apparatus of claim 15 wherein liquid-flow communication between each lateral and said header is provided only by said port.

17. The filtration apparatus of claim 11 wherein each of said nozzles comprises a collector and a hollow pipe, said collector being a port-defining structure, a proximal end of said pipe being attached to said collector.

18. The filtration apparatus of claim 17 wherein said pipe has an apertured portion adjacent said proximal end, said collector and said pipe being configured to permit passage of backwashing water upward from the lateral to which said nozzle is connected and outward via said pipe through a port defined by said collector into said filter bed.

19. The filtration apparatus of claim 11 wherein said air distribution plenum is disposed horizontally within said vessel substantially parallel to the cylindrical axis of said vessel, and has a cross-sectional area that is substantially less than the cross-sectional area of said header.

20. The filtration apparatus of claim 19 wherein said air distribution plenum has an upper wall portion that is coincident with an upper wall portion of said header.

21. The filtration apparatus of claim 20 wherein each one of said conduits is mounted on said upper wall portion of said air distribution plenum, each conduit extending into a corresponding one of said laterals to provide fluid-flow communication between said corresponding one of said laterals and said air distribution plenum.

22. The filtration apparatus of claim 21 wherein each one of said conduits is of generally rectangular cross-sectional configuration.

23. The filtration apparatus of claim 11 wherein said air manifold is disposed horizontally within said vessel substantially parallel to the cylindrical axis of said vessel.

24. The filtration apparatus of claim 23 wherein said air manifold and said air distribution plenum are separated by a common wall, said common wall being apertured to provide fluid-flow communication between said air manifold and said air distribution plenum.

25. The filtration apparatus of claim 24 wherein said common wall is provided with a plurality of orifices, said orifices being substantially evenly spaced at a substantially constant elevation in order to provide substantially uniform flow velocity therethrough.

* * * * *